Jan. 14, 1958   F. J. RUSSELL, JR   2,819,552
FISHING LURE
Filed Nov. 7, 1952

Inventor:
Frank J. Russell, Jr.
Attys.

United States Patent Office 2,819,552
Patented Jan. 14, 1958

2,819,552

FISHING LURE

Frank J. Russell, Jr., Marquette, Mich.

Application November 7, 1952, Serial No. 319,315

1 Claim. (Cl. 43—42.2)

This invention relates to a fishing lure and more particularly, to a so-called spinner or spoon type of lure which is adapted to have a selected, erratic form of motion as it is caused to move through the water.

This form of lure is capable of functioning in substantially the same fashion as a conventional spinner. However, it differs therefrom in that it has a twisted configuration similar to a propeller, and is adapted to have a line secured adjacent one end with a swivel mounting in selected positions of adjustment, and a suitable hook member likewise secured to the opposite end of the spoon or to the line, if desired.

These features give a lure, incorporating the invention, operational characteristics which can be varied to achieve entirely different results than can be attained with a conventional spinner or spoon.

It is therefore an object of this invention to provide a spinner or spoon which is capable of being used in the conventional fashion but which, at the same time, is adapted to be used as a lure having functional characteristics differing widely from a conventional spoon.

It is a further object to provide a spoon of the character described which is capable of being disposed in a plurality of positions of adjustment which, in turn, produce a plurality of differing modes of operation.

Still another object of this invention is to provide a lure of the character described which is very simple in construction and which may be manufactured economically.

Further objects and advantages of this invention will become evident as the description proceeds and from an examination of the accompanying drawing which illustrates one embodiment of the invention and in which similar numerals refer to similar parts throughout the several views.

Figure 1:
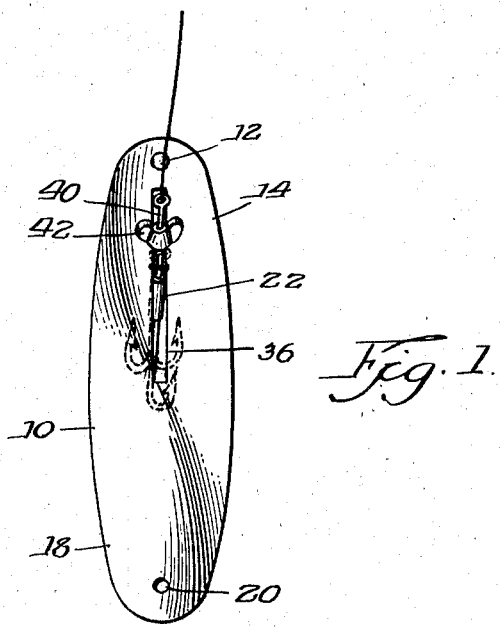
Figure 1 is a plan view of the spoon embodying the invention.
Figure 3:
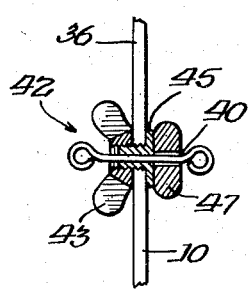
Figure 3 is a fragmentary view of a longitudinal section taken through the swivel as illustrated in Figure 2.
Figure 2:
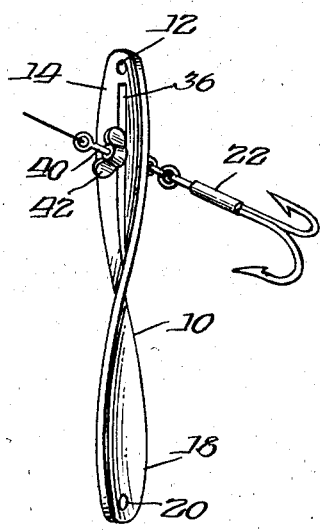
Figure 2 is a side elevational view of the spoon shown in Figure 1 disposed in operative association with a hook and a line member.

Referring now to Figure 1, one form of fishing lure embodying the invention is shown therein having an elongated symmetrically, somewhat rounded body portion 10 which is similar in configuration to a conventional spoon but which is preferably twisted substantially along its longitudinal axis as shown in Figure 2. A suitable opening 12 is provided at one end 14 of the body portion 10, which opening is adapted to serve as a means for securing the body portion 10 to a fishing line. If desired, the body member 10 can thus be utilized in substantially the same fashion as a conventional spoon. However, in addition, the opposite end 18 of the body portion 10 may also be provided with a suitable opening 20, which opening is adapted to receive a hook member, if desired. Adjacent the end 14 of the body portion 10 is a single longitudinal slot 36 disposed along the longtudinal axis of the body portion 10. The manner in which the body portion is secured in association with the line and hook member differs somewhat from that previously described in that means must be provided for securing the body portion 10 against longitudinal movement with respect to the leader 40 along the slot 36. In other words, it is desirable to permit the body portion 10 to freely rotate with respect to the leader 40, but it is not desirable to permit movement of the body 10 with respect to the position of the leader 40 in the slot 36. A suitable wing nut and collar assembly indicated generally by the numeral 42 is provided and is adapted to be clamped along the slot 36 at the desired point with the leader 40 extending therethrough and being freely rotatable with respect to said assembly 42. The wing nut and collar assembly 42 is comprised of the wing nut 43 and the collar 45, on which the wing nut 43 is threadedly mounted. Tightening of the wing nut 43 serves to secure the assembly 42 to the lure 10 at any desired position longitudinally along the opening 36. At the same time, shaft 40 will be freely rotatable within the bore of collar 45. Preferably a bead 47 is also provided to act as an anti-friction bearing and is rotatably mounted on the shaft 40. This use of the device permits a wider range in the relative position of the body portion 10 with respect to the leader 40.

In the drawing and specification, there has been set forth a preferred embodiment of the invention, and although specific terms are employed, they are used in a generic and descriptive sense only and not for purposes of limitation. Changes in form and in the proportion of parts, as well as the substitution of equivalents are contemplated, as circumstances may suggest or render expedient, without departing from the spirit or scope of this invention as further defined in the following claim.

It is claimed:

A fish lure comprising an elongated body portion twisted substantially along its longitudinal axis, said body portion having an elongated opening disposed in substantial alignment with the longitudinal axis of said body portion on one side of the lateral center line of said body portion, and means for rotatably securing said body portion to a line at a selected point along said elongated opening.

References Cited in the file of this patent

UNITED STATES PATENTS

| 1,575,139 | Wiesenfeld | Mar. 2, 1926 |
| 1,678,448 | Shannon | July 24, 1928 |
| 1,739,258 | Quin | Dec. 10, 1929 |
| 2,001,055 | De Witt | May 14, 1935 |
| 2,244,378 | Turner | June 3, 1941 |
| 2,294,081 | Fairfax | Aug. 25, 1942 |
| 2,608,788 | Niemi | Sept. 2, 1952 |
| 2,618,096 | Wagner | Nov. 18, 1952 |

FOREIGN PATENTS

| 720,641 | France | 1931 |
| 958,469 | France | 1949 |